United States Patent
Beil et al.

(10) Patent No.: US 7,453,330 B2
(45) Date of Patent: Nov. 18, 2008

(54) LINE FILTER

(75) Inventors: Kurt Beil, Parsberg (DE); Christian Paulwitz, Nittendorf (DE)

(73) Assignee: Epcos AG, Munich (DE)

( * ) Notice: Subject to any disclaimer, the term of this patent is extended or adjusted under 35 U.S.C. 154(b) by 91 days.

(21) Appl. No.: 11/706,490

(22) Filed: Feb. 15, 2007

(65) Prior Publication Data

US 2007/0139849 A1    Jun. 21, 2007

Related U.S. Application Data

(63) Continuation of application No. PCT/DE2005/001401, filed on Aug. 8, 2005.

(30) Foreign Application Priority Data

Aug. 16, 2004  (DE) .................. 10 2004 039 694.9

(51) Int. Cl.
*H02M 1/12* (2006.01)
*H03H 7/00* (2006.01)
(52) U.S. Cl. .................. 333/181; 363/47; 307/105
(58) Field of Classification Search .......... 333/12, 333/177, 181, 185; 307/105; 363/34, 40–47
See application file for complete search history.

(56) References Cited

U.S. PATENT DOCUMENTS

| | | | | |
|---|---|---|---|---|
| 4,967,334 A | * | 10/1990 | Cook et al. | 363/34 |
| 5,663,636 A | | 9/1997 | Fälldin et al. | |
| 6,075,425 A | | 6/2000 | Göpfrich et al. | |
| 6,377,479 B1 | * | 4/2002 | Ayano et al. | 363/40 |

FOREIGN PATENT DOCUMENTS

| | | |
|---|---|---|
| DE | 199 15 849 A1 | 10/2000 |
| EP | 0 684 679 A1 | 11/1995 |
| EP | 1 069 673 A1 | 1/2001 |
| JP | 2001016777 A * | 1/2001 |

* cited by examiner

*Primary Examiner*—Seungsook Ham
(74) *Attorney, Agent, or Firm*—Slater & Matsil, L.L.P.

(57) ABSTRACT

A line filter has a filter unit, which has an input and an output and also a current-compensated choke and a capacitance network. The choke has several phase windings on a common core. Each phase winding is connected in series with a phase conductor. The capacitance network has capacitors, which are each connected between a phase conductor and a neutral conductor. Another choke is provided in series to the neutral conductor, which is wound separately from the core.

18 Claims, 3 Drawing Sheets

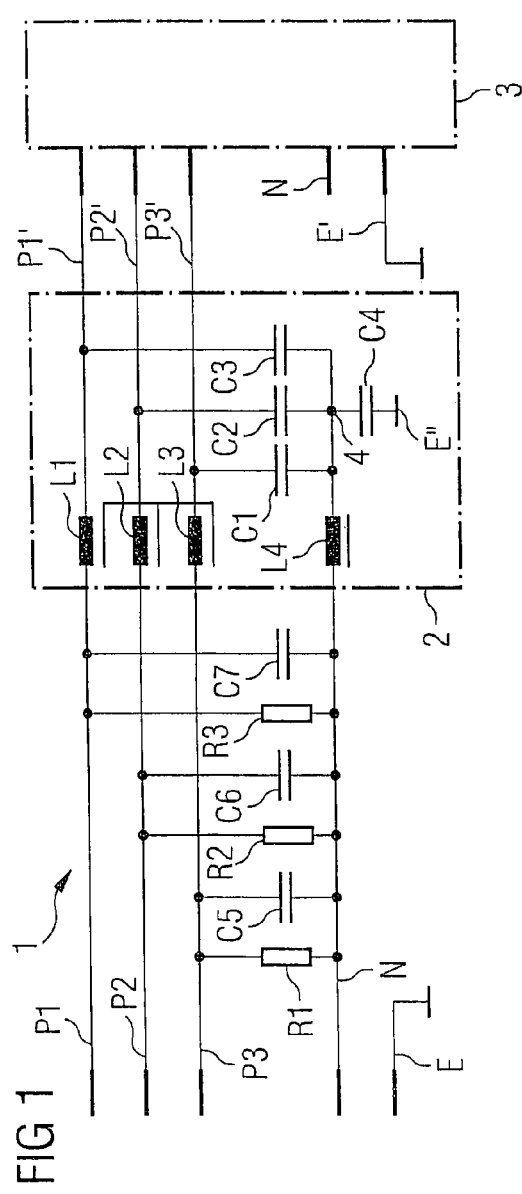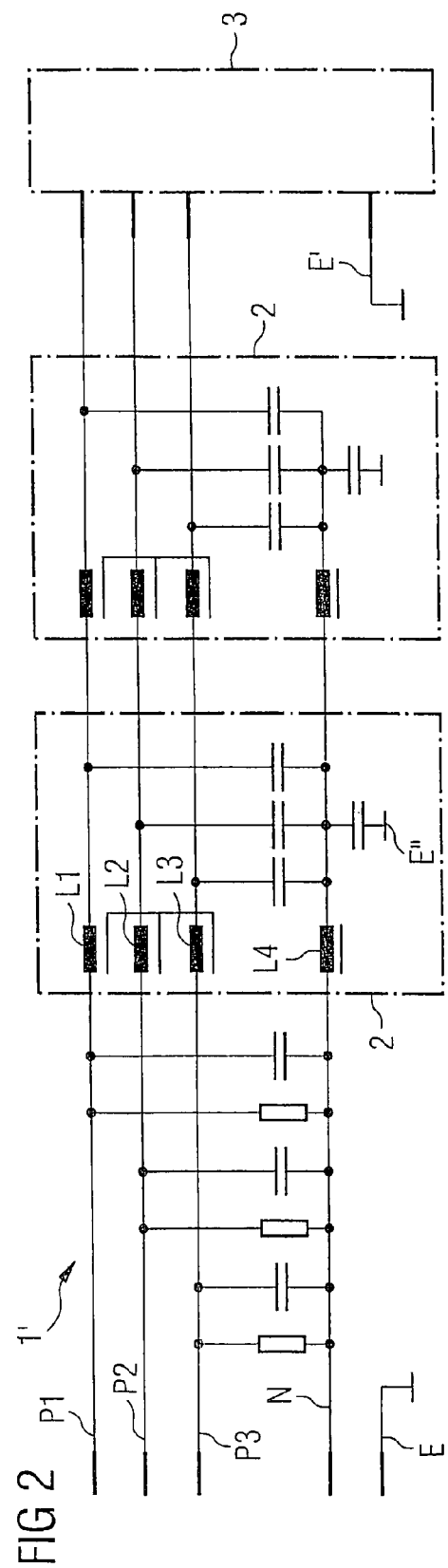

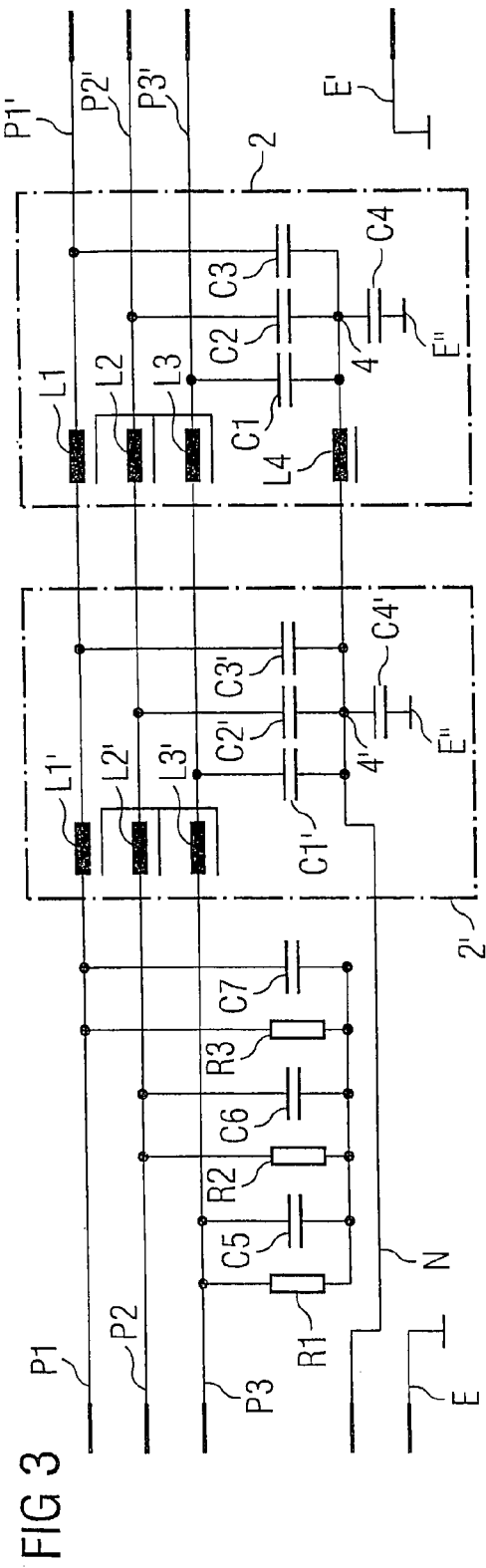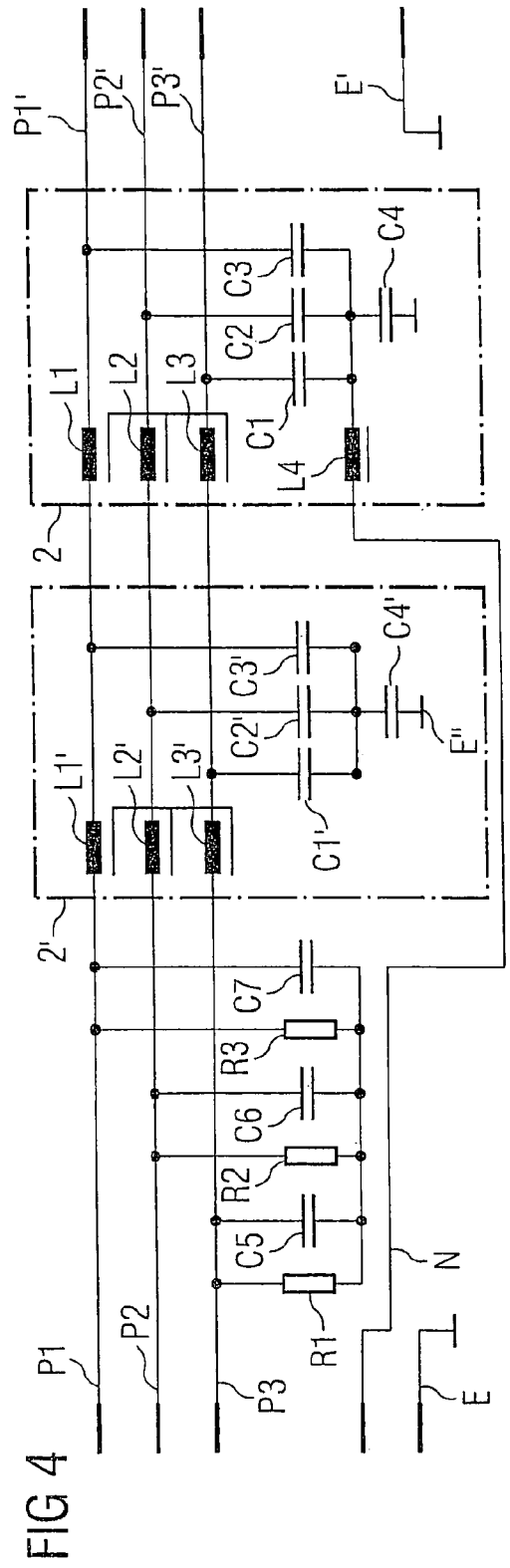

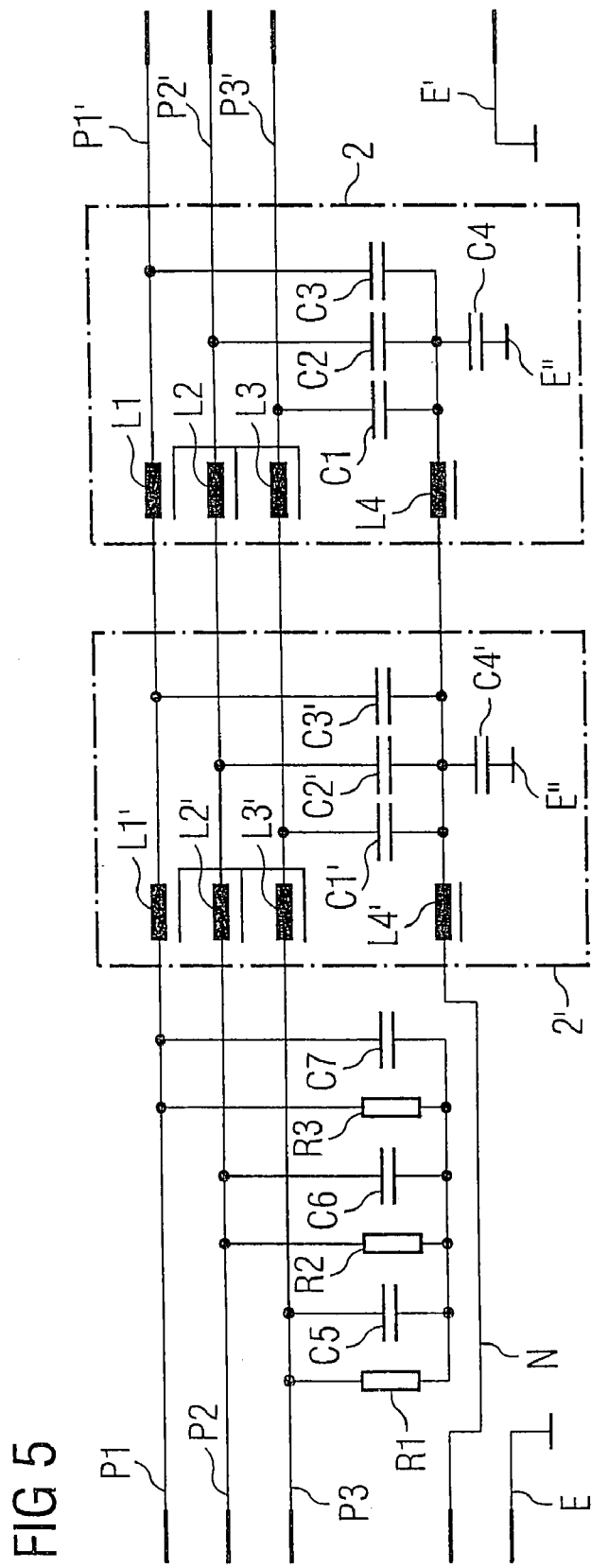

LINE FILTER

This application is a continuation of co-pending International Application No. PCT/DE2005/001401, filed Aug. 8, 2005, which designated the United States and was not published in English, and which is based on German Application No. 10 2004 039 694.9 filed Aug. 16, 2004, both of which applications are incorporated herein by reference.

TECHNICAL FIELD

Embodiments of the invention relate to a line filter.

BACKGROUND

European patent publication EP 1 069 673 A1 discloses a line input filter. This filter has a current-compensated choke and a capacitance network.

SUMMARY

One problem to be solved is to specify a line filter that is compatible with a residual current device.

The line filters described here are applied when noise voltage is to be equalized in order to provide a load with a suitable voltage. These filters have several inputs and outputs, which each receive and transmit different signals or signal portions.

A line filter is proposed with a filter unit, which has an input and an output and also a current-compensated choke and a capacitance network. The choke has several phase windings on a common core. Each phase winding is connected in series with a phase conductor. The capacitance network has several capacitors that are each connected between a phase conductor and a neutral conductor. Another choke, wound separately from the core, is provided in series with the neutral conductor.

The filter includes a zero terminal, which is provided for the purpose of being connected electrically to the neutral conductor of a power-supply network. An additional, fourth coil connects this terminal to the star point of the capacitance network, so that voltages that can be present at the star point due to asymmetric noise are short-circuited.

Here, the inductances in the neutral conductor are advantageously not realized by another winding on the current-compensated choke, but instead by a separate choke or winding. This is possible because no significant operating current flows via the neutral conductor, but instead only the high-frequency portions due to the neutral conductor preferably not being switched on the load side.

The separate realization of the zero conductor choke from the main choke is especially advantageous here, because the core of the main choke can be used geometrically entirely for the three phase windings such that a greatest possible main inductance can be achieved for a given core geometry. In addition, a better damping of high-frequency noise voltages and currents can also usually be achieved through the geometric separation of the zero conductor choke from the main choke.

Advantageously, the neutral line can be led to the input side of the filter unit without, however, providing a neutral conductor connection at the output of the filter unit. Thus, it is possible to not substantially increase the expense required for a typical 3-conductor filter, for example, which is equipped with relatively large capacitors connected to ground and which is therefore not compatible with a residual current circuit breaker, so that compatibility with a residual current circuit breaker necessary for the same interference suppression effect can be guaranteed.

The neutral conductor is used to allow the leakage current caused by the line filter, for example, a radio interference suppression filter, to flow essentially not via a protective conductor, but instead via the neutral conductor, so that the residual current can be reduced.

For a radio interference suppression filter, with the same filter effect, the component expense is only slightly greater than for a corresponding three-conductor filter not compatible with a residual current circuit breaker, but is significantly less than for a four-conductor filter (characterized by a zero conductor connection also on the load side of the filter).

Line filters are explained in more detail with reference to the following embodiments and figures.

BRIEF DESCRIPTION OF THE DRAWINGS

For a more complete understanding of the present invention, and the advantages thereof, reference is now made to the following descriptions taken in conjunction with the accompanying drawings, wherein:

FIG. 1 shows a line filter with a filter unit having a fourth inductor wound separately from a choke;

FIG. 2 shows a line filter with filter units connected one behind the other, each having inductors wound separately from a choke;

FIG. 3 shows a line filter from FIG. 2, wherein one of the filter units does not have an inductor wound separately from a choke;

FIG. 4 shows a line filter from FIG. 3, wherein a neutral line is not connected to the circuit elements switched before the filter unit; and FIG. 5 shows a line filter from FIG. 2, wherein a neutral line is not connected to the circuit elements connected before the filter unit.

The following list of reference symbols can be used in conjunction with the figures:

| 1 | Line filter | L1 | First phase winding |
|---|---|---|---|
| 1' | Alternative line filter | L2 | Second phase winding |
| 2, 2' | Filter unit | L3 | Third phase winding |
| 3 | Load | L4 | Fourth phase winding |
| P1 | First phase line | C1 | First capacitor |
| P2 | Second phase line | C2 | Second capacitor |
| P3 | Third phase line | C3 | Third capacitor |
| N | Neutral line | C4 | Fourth capacitor |
| E | First ground line | C5 | Fifth capacitor |
| E' | Second ground line | C6 | Sixth capacitor |
| E" | Third ground line | C7 | Seventh capacitor |

DETAILED DESCRIPTION OF ILLUSTRATIVE EMBODIMENTS

FIG. 1 shows how a line filter 1 can be constructed on the input side with phase conductors P1 to P3, a neutral conductor N, and a ground line E. The conductors, with the exception of the ground line E, open into a filter unit 2, which is equipped with a current-compensated choke. The choke preferably contains 3 phase windings or inductors L1 to L3 wound around a common core.

Another choke or inductor L4 is provided which is constructed separately from the mentioned core and connected to the neutral conductor N or is part of the neutral conductor.

The filter unit 2 is connected on the output side to phase conductors P1' to P3', which are preferably connected to a load 3. The load 3 can be a converter, a polyphase machine, or an accumulator or line charger. The phase conductors can be realized as cables. The load 3 is also usually provided with a ground line E'.

The filter unit 2 is preferably provided with an arrangement of 3 capacitors C1 to C3, which are each connected to one of the phase conductors P1' to P3'. The phase conductors P1' to P3' form the parts of the phase conductors P1 to P3, which, switched after the inductors L1 to L3, run in the direction of the load 3. The arrangement of capacitors C1 to C3 can be understood as a star-shaped capacitance network. Another capacitor C4 preferably connected to the star point 4 of the star-shaped arrangement of capacitors is connected to this capacitance network and a ground line E'' of the filter unit 2.

The inductor L4 on the neutral conductor N does not have to be designed to the dimensioned current of the line filter 1, i.e., not to the phase conductors P1 to P3 or P1' to P3', because only current portions that are generated capacitively flow via the neutral conductor. This can be guaranteed in that a connection of the neutral conductor to the output of the filter unit does not have to be provided.

In one variant, the load 3 itself can contain a filter unit 2 of the mentioned form, so that it can be connected without additional means to a power supply. Alternatively, a filter unit 2 of the mentioned type is integrated directly into a power supply.

The resistors R1 to R3 specified in the circuit examples are typically required for safety reasons for discharging the capacitors after the line voltage is turned off and have no effect on the described functions of the filter circuit.

In one test, a line filter was constructed with the following electrical values:

L1=L2=L3=3.9 mH

C1=C2=C3=C4=C5=C6=C7=2.2 μF

L4=3.3 mH

Operating mode: frequency converter with motor 2.2 kW; load 46 Hz/4.2 A; switching frequency 4 kHz; shielded motor line.

A residual current operated device of sensitivity 30 mA was contained in a ground line.

During the operation of the arrangement named above, it could be achieved that a comparable filter effect in terms of noise voltage like for a 3-conductor filter could be achieved without a neutral conductor, which, however, did not trigger the residual current operated device.

In another test, the following values were selected for the inductors:

L1=L2=L3=1.2 mH

L4=800 μH (corresponds to a single winding)

Here, a corresponding result was also achieved.

FIG. 2 shows a line filter 1' formed with two filter units 2 switched or cascaded one behind the other and constructed in the same or at least in a similar way. Here, an arbitrary number of cascades of filter units 2 is possible in the line filter, also with variants of the filter units containing alternative circuit elements. The filter units preferably share common phase conductors P1 to P3 or P1' to P3' and also a common neutral conductor N connected to the capacitors and the separately wound inductors. The neutral conductor is here also connected to the resistors and capacitors switched before the filter units.

In contrast to FIG. 2, FIG. 3 shows two filter units 2 and 2' that differ from each other and are switched one behind the other, wherein the additional inductor L4 on the neutral conductor N is missing in one of filter units 2'.

In the arrangement according to FIG. 3, two different filter units 2 and 2' are provided. The first filter unit 2 is formed like the filter unit 2 in FIG. 1, wherein the electrical rating of the inductors L1 to L3 and also L4 and the rating of the capacitors C1 to C4 can differ. In addition, in one series circuit to the filter unit 2, another filter unit 2' is provided matching the filter unit 2 in many features except that the additional inductor L4 in the neutral line N is missing.

The filter units 2 and 2' are switched such that the first filter unit 2' is connected to the network made from resistors R1, R2 and R3 and capacitors C5, C6 and C7 so that each inductor L1', L2' and L3' is connected in the respective phase lines P1, P2, and P3. Then the capacitors C1', C2' and C3' are provided being switched in a manner analogous to FIG. 1, so that each of the capacitors is connected to a phase line and this phase line connects to the neutral line N. The capacitor C4' is preferably connected to the star point of the other three capacitors C1', C2' and C3' and connects these, in turn, to the ground line E'', which can also include parts of the filter housing.

A second filter unit 2 is provided switched after the first filter unit 2', wherein the inductors L1, L2 and L3 corresponding to filter unit 2' are connected, in turn, to the phase lines. In addition to the filter unit 2', there is another phase winding L4 lying in the neutral line N that connects the neutral line N to the star point 4 of the filter unit 2.

In one test, an arrangement according to FIG. 3 was constructed, wherein the following electrical parameters were selected for the filter unit 2':

L1'=L2'=L3'=1.7 mH

C1'=C2'=C3'=1 μF

C4'=100 nF

For the characteristic numbers of the filter unit 2, the following values were used:

L1=L2=L3=1.7 mH

C1=C2=C3=2.2 μF=C4

L4=1.6 mH (with two windings in series)

Also with this test arrangement, the triggering of the FI [residual current] circuit breaker could also be prevented (for otherwise equal test conditions as already described above).

In contrast to FIG. 3, FIG. 4 shows a neutral conductor N not connected to the circuit elements of the filter unit 2', which has no separately wound inductance. The neutral conductor is likewise not connected to the circuit elements R1 to R3 and C5 to C7 switched before the filter units 2 and 2'.

The neutral conductor N is connected to the capacitors C1, C2, C3 and C4 of the load-side filter unit 2 only via the inductor L4.

In one embodiment, the following electrical parameters can be considered for the filter arrangement according to FIG. 4:

L1'=L2'=L3'=1.7 mH

C1'=C2'=C3'=1 μF

C4'=100 nF $L1=L2=L3=1.7$ mH $C1=C2=C3=C4=2.2$ μF $L4=1.6$ mH (with two windings in series)

For a cascaded or series circuit of several filter units, the inductors, which lie in the phase lines, are preferably the same size in terms of their electrical rating (i.e., $L1=L1'=L2=L2'=L3=L3'$). However, different inductance values ($L1=L2=L3 \neq L1'=L2'=L3'$) can also be used. The capacitors connected to the ground line are preferably selected so that the capacitors close to the load have a greater capacitance than the capacitors away from the load.

In contrast to FIG. 2, FIG. 5 shows an embodiment of the invention in which the neutral conductor N is connected to the inductors L4 and L4' of the filter units 2 and 2', but not to the circuit elements R1 to R3 and C4 to C6 switched before the filter units.

In the embodiment according to FIG. 5, the following selection of electrical parameters can, according to a test, be used:

$L1'=L2'=L3'=1.7$ mH $C1'=C2'=C3'=1$ μF $C4'=100$ nF $L1=L2=L3=1.7$ mH $C1=C2=C3=C4=2.2$ μF $L4=L4'=1.6$ mH

The inductors L4 and L4' are realized in the form of two chokes in series, wherein the capacitors C1' to C4' are connected between the chokes.

What is claimed is:

1. A line filter comprising:
    a plurality of input phase conductors;
    a plurality of output phase conductors;
    a filter unit comprising:
        an input coupled to the input phase conductors;
        an output coupled to the output phase conductors;
    a current-compensated choke having a plurality of phase windings on a common core, each phase winding being coupled into a respective filter unit phase conductor;
    a capacitance network having a plurality of capacitors, each capacitor coupled between a filter unit phase conductor and a neutral conductor; and
    another choke coupled in series to the neutral conductor, the another choke being wound separately from the core.

2. The line filter according to claim 1, further comprising another capacitor between the neutral conductor and a reference ground.

3. The line filter according to claim 1, further comprising a second line filter coupled between the input phase conductor and the output phase conductors.

4. The line filter according to claim 3, wherein the line filter and the second line filter are of the same type.

5. The line filter according to claim 3, wherein the filter unit and the second filter unit have a common neutral conductor.

6. The line filter according to claim 3, wherein the second filter unit comprises a choke with a plurality of phase windings on a common core, the filter unit having no inductor separate from the common core.

7. The line filter according to claim 1, further comprising circuit elements coupled to the input phase conductors.

8. The line filter according to claim 7, wherein the circuit elements comprise capacitors.

9. The line filter according to claim 8, wherein the neutral conductor is connected to the circuit elements.

10. The line filter according to claim 9, wherein each circuit element is coupled between an input phase conductor and the neutral conductor.

11. The line filter according to claim 1, wherein the input phase conductors, the filter unit phase conductors and the output phase conductors are coupled in series with each other.

12. The line filter according to claim 11, wherein the choke is coupled in series between the input phase conductors and the filter unit phase conductors.

13. A filter unit for use with a line filter, the filter unit comprising:
    a current-compensated choke comprising a plurality of phase windings on a common core, each phase winding being connected into one of a plurality of phase conductors;
    a capacitance network comprising a plurality of capacitors, each capacitor being connected between one of the phase conductors and a neutral conductor; and
    another choke coupled in series with the neutral conductor, the another choke being wound separately from the common core.

14. The filter unit of claim 13, further comprising a further capacitor coupled between the neutral conductor and a reference ground.

15. The filter unit of claim 13, wherein the current-compensated choke comprises exactly three windings on the common core.

16. The filter unit of claim 15, wherein a first winding is coupled in series with a first phase conductor, a second winding is coupled in series with a second phase conductor, and a third winding coupled in series with a third phase conductor.

17. The filter unit of claim 16, wherein the capacitance network comprises:
    a first capacitor coupled between the first phase conductor and the neutral conductor;
    a second capacitor coupled between the second phase conductor and the neutral conductor; and
    a third capacitor coupled between the third phase conductor and the neutral conductor.

18. The filter unit of claim 17, further comprising a further capacitor coupled between the neutral conductor and a reference ground.

* * * * *